United States Patent
Ikeda (12)

(10) Patent No.: US 6,505,220 B1
(45) Date of Patent: Jan. 7, 2003

(54) METHOD AND APPARATUS FOR DETECTING A UNIQUE WORD

(75) Inventor: Yasunari Ikeda, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/260,780

(22) Filed: Mar. 2, 1999

(30) Foreign Application Priority Data

Mar. 2, 1998  (JP) .......................................... 10-049203

(51) Int. Cl.[7] .............................................. G06F 17/15
(52) U.S. Cl. ..................................... 708/212; 708/425
(58) Field of Search ............................. 708/212, 425, 708/422

(56) References Cited

U.S. PATENT DOCUMENTS

| | | | | |
|---|---|---|---|---|
| 4,392,232 A | * | 7/1983 | Andren et al. ............... | 708/425 |
| 5,016,206 A | * | 5/1991 | Shinonaga ................... | 708/212 |
| 5,093,846 A | * | 3/1992 | Walton, Jr. et al. ......... | 708/212 |
| 5,239,497 A | * | 8/1993 | McKay et al. ............... | 708/212 |
| 5,412,589 A | * | 5/1995 | Williams et al. ............ | 708/425 |
| 5,511,099 A | | 4/1996 | Ko et al. ..................... | 375/368 |

FOREIGN PATENT DOCUMENTS

| EP | 0 602 249 A1 | 6/1994 |
|---|---|---|
| EP | 0 717 538 A2 | 6/1996 |

* cited by examiner

*Primary Examiner*—David H. Malzahn
(74) *Attorney, Agent, or Firm*—Lerner, David, Littenberg, Krumholz & Mentlik, LLP (57) ABSTRACT

A signal processing apparatus and method and a provision medium arranged to enable detection of a unique pattern in a short time with high accuracy. A value representing a correlation between an input signal and a reference signal is calculated and the calculated correlation value is compared with a predetermined threshold value. The invention makes it possible to detect, for example, a unique word in a short time with high accuracy without influence of noise.

4 Claims, 8 Drawing Sheets

METHOD AND APPARATUS FOR DETECTING A UNIQUE WORD

BACKGROUND OF THE INVENTION

The present invention relates to a signal processing apparatus and method and a provision medium and, more particularly, to a signal processing apparatus and method and a provision medium arranged to enable detection of a unique pattern with high accuracy.

Regular digital multichannel broadcasting using a communication satellite (hereinafter referred to as "CS") has been started in Japan and related various services have also been started or are about to be started. With respect to broadcasts using broadcasting satellites (hereinafter referred to as "BS"), a plan for a digital broadcasting service using the BS4 scheduled to be put into the sky has been reported in the Radio Regulatory Council.

Because BSs have power larger than that of CSs, use of a modulation system having a transmission efficiency higher than that of the quadrature phase shift keying (QPSK) system conventionally used with CSs is being studied. To ensure compatibility with other media such as CSs, ground waves and cable networks, transmission of a bit stream based on the socalled transport stream (hereinafter referred to as "TS") prescribed in MPEG (Moving Picture Experts Group) 2 has been proposed. The TS is formed of 188-byte packets containing one-byte units of sync bytes. Since a Reed-Solomon code (hereinafter referred to as "RS code") formed by adding 16-byte parity for error correction to the TS is being used in cable digital broadcasting and so on, use of the (204, 188) RS code formed on the TS has also been proposed for BS digital broadcasting.

With this background, in documents already made public: "Eisei ISDB niokeru saidaidensoyoryo to eiseihosopuran eno tekiyo (Maximum transmission capacity in satellite ISDB and application to satellite broadcasting plan)", the Journal of Denshijohotsushin Gakkai (the Institute of Electronics, Information and Communication Engineers), Vol.J79-B-II No.7, "Eisei ISDB densohoshiki no kento (Study of satellite ISDB transmission system)", a technical report from Eizojohomedia Gakkai (the Institute of Image Information and Television), Vol.21 BCS-97-12, etc., methods are proposed in which a convolutionally coded BPSK (binary phase shift keying) signal, a QPSK (quadrature phase shift keying) signal, or a trellis-coded 8PSK (octaphase shift keying) signal is used as the main signal portion for payload information other than the sync portion in the (204, 188) RS-coded TS, and in which transmission information such as information about the modulation method, the code rate, etc., (hereinafter referred to as "transmission multiplexing configuration control (TMSS) information") is transmitted in a BPSK signal by using the sync portion of the TS.

Figure 7:
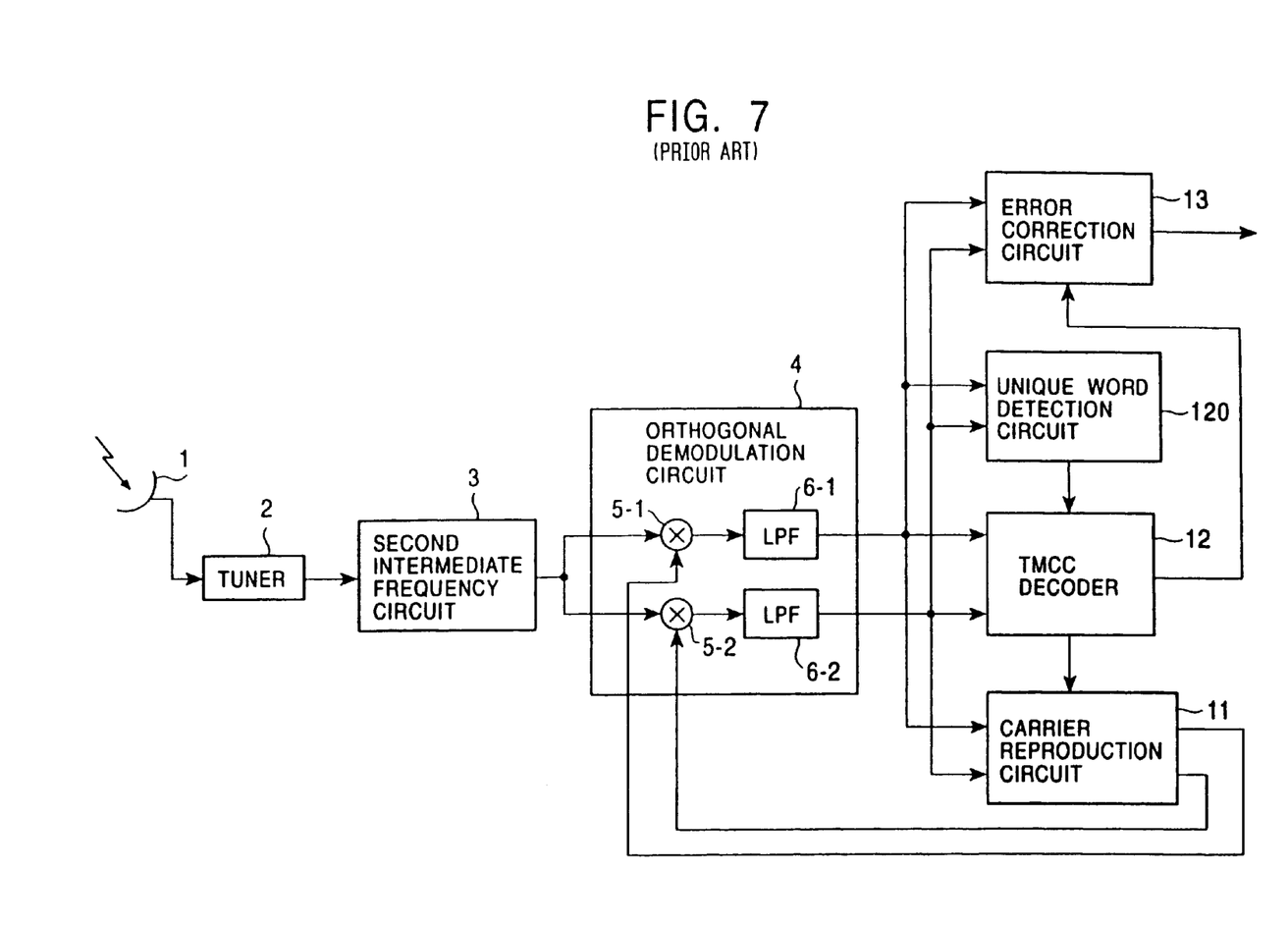
FIG. 7 is a block diagram showing the configuration of an example of a conventional receiver.

FIG. 7 shows the configuration of an example of a satellite digital broadcast receiver with which one of the methods described in the above-mentioned documents is used. A broadcast signal from a BS, e.g., a BPSK-modulated signal is captured by an antenna 1 and frequency-converted into an intermediate frequency signal by an unillustrated frequency conversion circuit incorporated in the antenna 1, and this intermediate frequency signal is supplied to a tuner 2. After controlling the antenna 1 to receive the broadcast signal from the BS, the tuner 2 reads a signal of a program designated by a predetermined operation, and outputs the read signal to a second intermediate frequency circuit 3. The second intermediate frequency circuit 3 shapes the spectrum of the signal input from the tuner 2 and performs predetermined amplification of the signal, and outputs the signal to multipliers 5-1 and 5-2 of an orthogonal demodulation circuit 4.

Each of the multipliers 5-1 and 5-2 of the orthogonal demodulation circuit 4 multiplies together the BPSK-modulated signal input from the second intermediate frequency circuit 3 and one of two carriers input from a carrier reproduction circuit 11 in phase-orthogonal to each other, and outputs a multiplication result to the carrier reproduction circuit 11, to a unique word detection circuit 120, to a TMCC decoder 12 and to an error correcting circuit 13 via low-pass filters (LPF) 6-1 and 6-2.

The unique word detection circuit 120 detects from the input signal a unique pattern formed as a frame sync signal, and outputs a detection result to the TMCC decoder 12. The TMCC decoder 12 decodes a TMCC signal in the input signal and outputs a decoding result to the carrier reproduction circuit 11 and to the error correcting circuit 13.

The carrier reproduction circuit 11 is supplied with a signal representing a phase error of the carriers which occurs when the TMCC decoder decodes the TMCC signal. The carrier reproduction circuit 11 reproduces two orthogonal carriers according to the supplied signal and outputs the reproduced carriers to the orthogonal demodulation circuit 4. The error correcting circuit 13 has unillustrated components: a Viterbi decoder, a Reed-Solomon decoder and an interleave circuit. The error correcting circuit 13 corrects a transmission channel error in the input main signal (QPSK signal) based on the TMCC signal from the TMCC decoder 12, and outputs the corrected signal.

Figure 8:
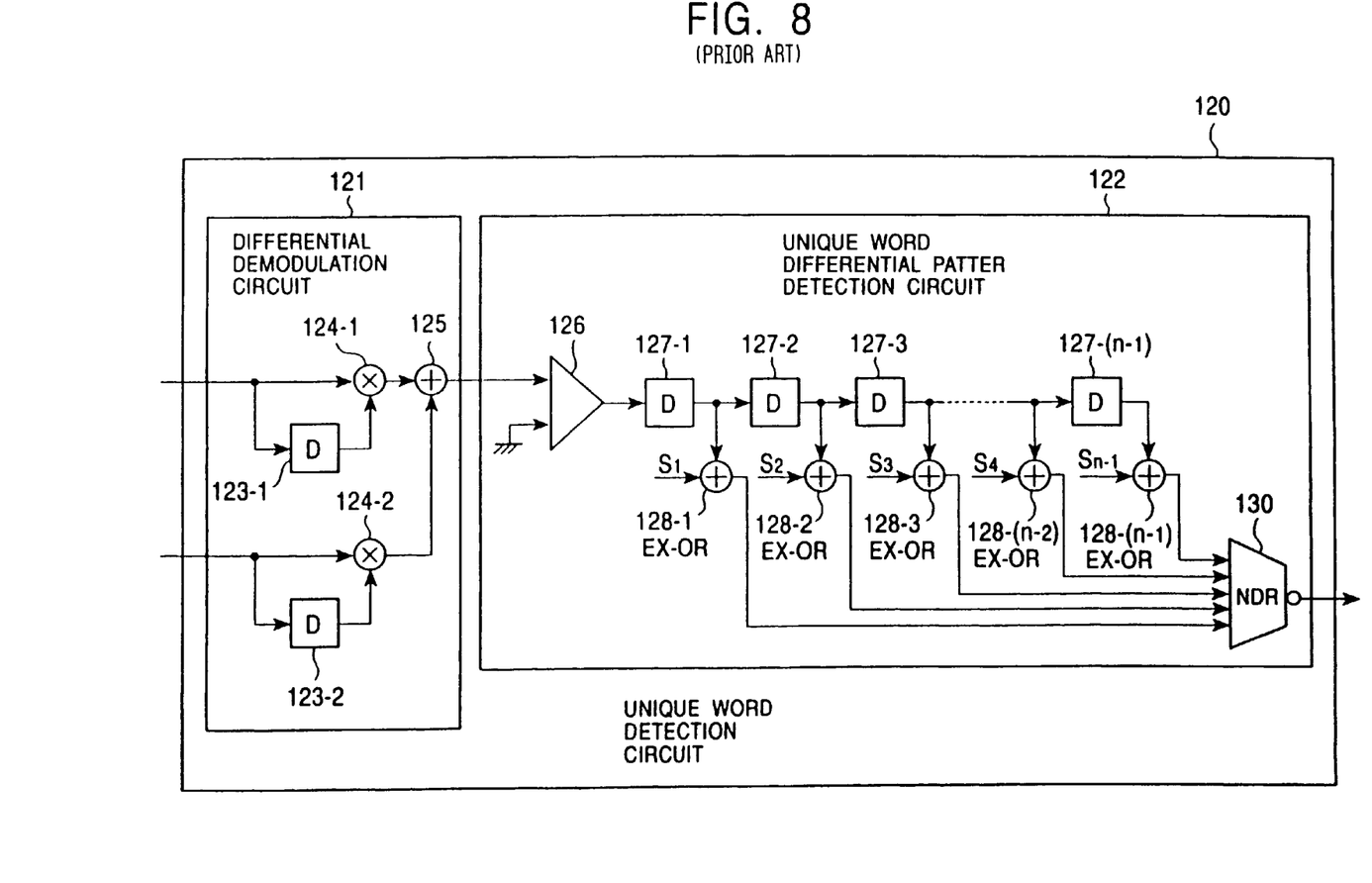
FIG. 8 is a block diagram showing the configuration of an example of a unique word detection circuit 120 shown in FIG. 7.

FIG. 8 shows the configuration of an example of the unique word detection circuit 120. The unique word detection circuit 120 is formed by a differential demodulation circuit 121 and a unique word differential pattern detection circuit 122. A register 123-1 of the differential demodulation circuit 121 delays, for example, the sync signal of the BPSK signal input from the orthogonal demodulation circuit 4 by a predetermined time period (corresponding to one symbol), and outputs the delayed signal to a multiplier 124-1. The multiplier 124-1 multiplies together the signal (sync signal) directly input from the orthogonal demodulation circuit 4 and the signal delayed by the predetermined time period and supplied from the register 123-1, and outputs a multiplication result to an adder 125.

The register 123-2 of the differential demodulation circuit 121 also delays, for example, the orthogonal signal of the BPSK signal input from the orthogonal demodulation circuit 4 by the predetermined time period (corresponding to one symbol), and outputs the delayed signal to a multiplier 124-2. The multiplier 124-2 multiplies together the signal (orthogonal signal) directly input from the orthogonal demodulation circuit 4. and the signal delayed by the predetermined time period and supplied from the register 123-2, and outputs a multiplication result to the adder 125.

The adder 125 adds together the signal input from the multiplier 124-1 and the signal input from the multiplier 124-2, and supplies an addition result to a binalization circuit 126 of the unique word differential pattern detection circuit 122.

The binalization circuit 126 of the unique word differential pattern detection circuit 122 binalizes the signal input from the adder 125 of the differential demodulation circuit 121 by a data width of one bit, and outputs the binalized signal to a register 127-1. The register 127-1 stores the signal from the binalization circuit 126 and outputs the stored signal to a register 127-2 and to an exclusive-OR circuit (hereinafter referred to as "EX-OR") 128-1 in the next stage in synchronization with a clock. The EX-OR 128-1 performs exclusive-OR processing of the signal from the register 127-1 and a predetermined signal S1 separately input, and outputs a processing result to a NOR circuit 130.

Similarly, each of registers 127-2 to 127-(n−1) records the input signal and outputs the recorded signal to one of the registers 127-3 to 127-(n−1) and to one of EX-ORs 128-1 to 128-(n−1) in the next stage in synchronization with the clock. The register 127-(n−1) outputs the stored signal to the EX-OR 128-(n−1). Each of the EX-ORs 128-1 to 128-(n−1) performs exclusive-OR processing of the input signal and outputs a processing result to the NOR circuit 130. The NOR circuit 130 performs NOR processing of the signals input from the EX-ORs 128-1 to 128-(n−1), and outputs a processing result to the TMCC decoder 12.

In the case of this arrangement, since the received signal has a BPSK signal constellation, differential demodulation results are obtained as real numbers. Therefore, the differential demodulation circuit 121 is formed by two registers 123-1 and 123-2 for delaying the real and imaginary parts, respectively, by the one-symbol period, multipliers 124-1 and 124-2 each for multiplying together the real or imaginary part and the signal obtained by delaying the real or imaginary part by the one-symbol period, and adder 125 for adding together multiplication results from these multipliers.

Ordinarily, if an n-bit unique word is used, an (n−1)-bit unique differential pattern is obtained. Accordingly, the unique word differential pattern detection circuit 122 has registers 127-1 to 127-(n−1) corresponding to n−1 bits. The exclusive-ORs of the corresponding bits of the outputs from these registers and the known (n−1)-bit unique word differential pattern s1 to s(n−1) are calculated by the EX-ORs 128-1 to 128-(n−1). When the input signal is the unique word, the contents of the registers 127-1 to 127-(n−1) and the unique word differential pattern s1 to s(n−1) coincide with each other and a logical value "0" is output from the EX-ORs 128-1 to 128-(n−1). The NOR circuit 130 recognizes this result to output a logical value "1".

The TMCC decoder 12 decodes the TMCC signal when it obtains "1" from the NOR circuit 130 of the unique word detection circuit 120.

Because of the above-described detection of a unique word based on the difference between the phase of the two signals one of which precedes the other (differential demodulation using a noise-containing received signal used as a reference signal), a transmission channel error condition of one of the two signals influences the other signal. Mainly for this reason, the carrier to noise power ratio (C/N) is low. Moreover, since a known sync pattern, e.g., a unique word differential pattern is detected from the signals demodulated by hard-decision demodulation (demodulation by the orthogonal demodulation circuit), the detection accuracy is not reliably high. For the above-described reasons, it is difficult to accurately detect a unique word, and the necessary detection time is disadvantageously long.

SUNMARY OF THE INVENTION

In view of the above-described circumstances, an object of the present invention is to provide a signal processing apparatus and method and a provision medium arranged to enable detection of a unique pattern in a short time with high accuracy.

To achieve this object, according to one aspect of the present invention, there is provided a signal processing apparatus comprising calculation means for calculating a value representing a correlation between an input signal and a reference signal, and comparison means for comparing the calculated correlation value with a predetermined threshold value.

According to another aspect of the present invention, there is provided a signal processing apparatus comprising the step of calculating a value representing a correlation between an input signal and a reference signal, and the step of comparing the calculated correlation value with a predetermined threshold value.

According to still another aspect of the present invention, there is provided a provision medium for providing a program for executing a process comprising the step of calculating a value representing a correlation between an input signal and a reference signal, and the step of comparing the calculated correlation value with a predetermined threshold value.

DETAILED DESCRIPTION

Embodiments of the present invention will be described below with reference to the accompanying drawings.

Figure 1:
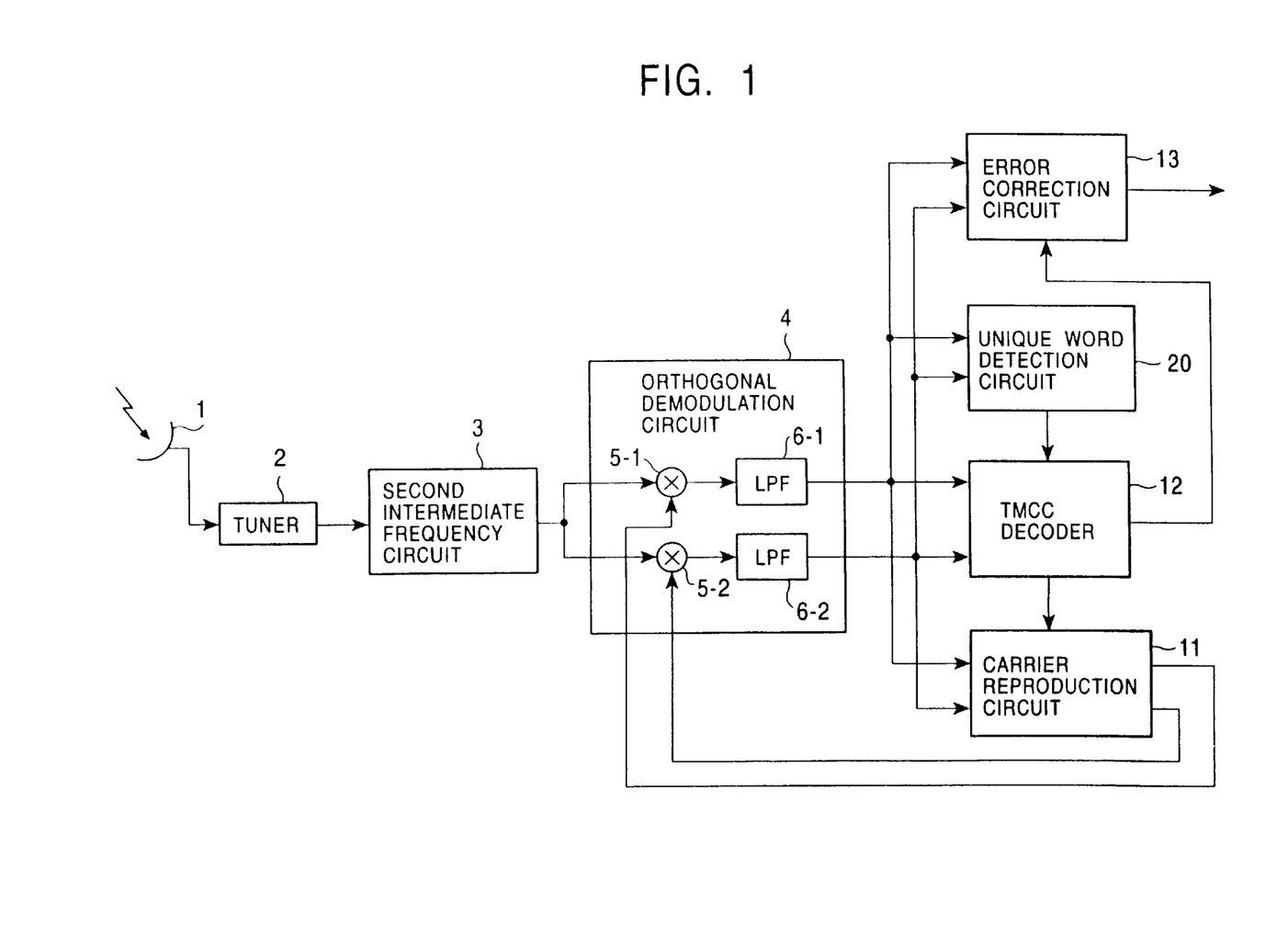
FIG. 1 is a block diagram showing the configuration of a broadcast receiver to which a signal processing apparatus of the present invention has been applied.

FIG. 1 shows the configuration of a broadcast receiver to which a signal processing apparatus of the present invention has been applied. This broadcast receiver has a unique word detection circuit 20 substituted for the unique word detection circuit 120 in the receiver shown in FIG. 7. That is, the other sections forming this receiver are the same as those of the receiver shown in FIG. 7, and the same description for them will not be repeated.

Figure 2:
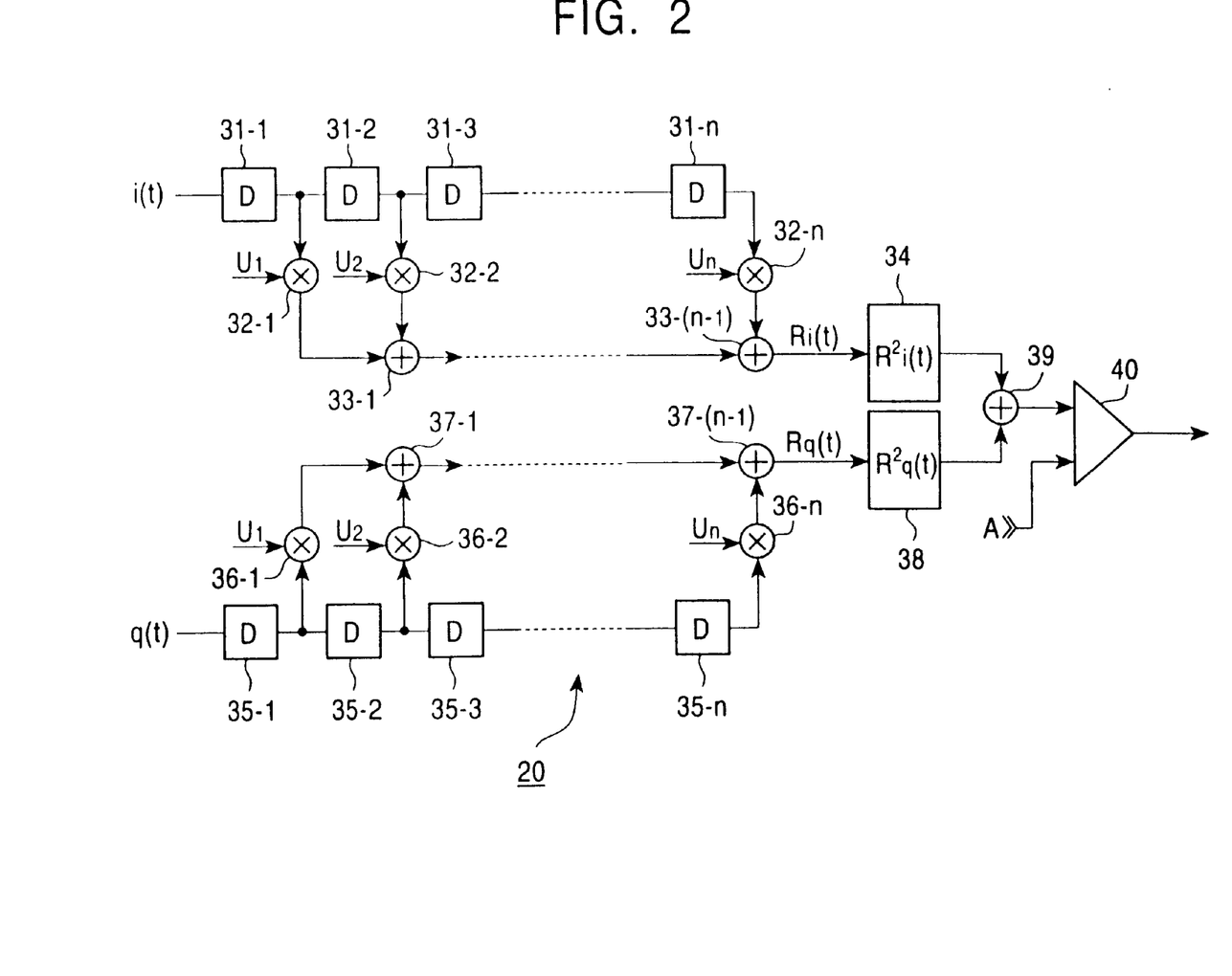
FIG. 2 is a block diagram showing the configuration of an example of a unique word detection circuit 20 shown in FIG. 1 and representing a first embodiment of the present invention.

FIG. 2 shows the configuration of an example of the unique word detection circuit 20 which represents a first embodiment of the present invention. A register 31-1 is adapted to store a signal (real part) input from the orthogonal demodulation circuit 4 and to output the stored data to a multiplier 32-1 and to a register 31-2 in synchronization with a clock. The multiplier 32-1 is adapted to multiply the signal input from the register 31-1 by a predetermined tap coefficient $U_1$ and to output a multiplication result to an adder 33-1.

The register 31-2 is adapted to store the signal input from the register 31-1 and to output the stored data to a multiplier 32-2 and to a register 31-3 in synchronization with the clock. The multiplier 32-2 is adapted to multiply the signal input from the register 31-2 by a predetermined tap coefficient $U_2$ and to output a multiplication result to the adder 33-1.

The adder 33-1 is adapted to add together the multiplication result input from the multiplier 32-1 and the multiplication result input from the multiplier 32-2 and to output an addition result to an adder 33-2 (not shown).

Thus, the n registers 31-1 to 31-n are arranged to successively shift the input signal from each stage to the subsequent one in synchronization with the clock, and to supply the stored signal to the n multipliers 32-1 to 32-n by respective timings. Each of the multipliers 32-1 to 32-n is adapted to multiply the signal supplied from the corresponding one of the registers 31-1 to 31-n by one of the tap coefficients $U_1$ to Un assigned to the multipliers, and to output a multiplication result to one of the (n−1) adders 33-1 to 33-(n−1).

Each of the adders 33-1 to 33-(n−1) is adapted to add together the two multiplication results input from the multipliers 32-1 to 32-n. Each of the adders 33-1 to 33-(n−1) outputs an addition result to the subsequent adder in the adders 33-2 to 33-(n−1). An addition result output from the adder 33-(n−1) is a cumulative value of the addition results from the adders 33-1 to 33-(n−1). The addition result from the adder 33-(n−1) is input to a squaring circuit 34.

A register 35-1 is adapted to store a signal (imaginary part) input from the orthogonal demodulation circuit 4 and to output the stored data to a multiplier 36-1 and to a register 35-2 in synchronization with the clock. The multiplier 36-1 is adapted to multiply the signal input from the register 35-1 by the predetermined tap coefficient $U_1$, and to output a multiplication result to an adder 37-1.

The register 35-2 is adapted to store the signal input from the register 35-1 and to output the stored data to a multiplier 36-2 and to a register 35-3 in synchronization with the clock. The multiplier 36-2 is adapted to multiply the signal input from the register 35-2 by the predetermined tap coefficient $U_2$ and to output a multiplication result to the adder 37-1.

The adder 37-1 is adapted to add together the multiplication result input from the multiplier 36-1 and the multiplication result input from the multiplier 36-2 and to output an addition result to an adder 37-2 (not shown).

Thus, the n registers 35-1 to 35-n are arranged to successively shift the input signal from each stage to the subsequent one in synchronization with the clock, and to supply the stored signal to the n multipliers 36-1 to 36-n by respective timings.

Each of the multipliers 36-1 to 36-n is adapted to multiply the signal supplied from the corresponding one of the registers 35-1 to 35-n by one of the tap coefficients $U_1$ to Un, and to output a multiplication result to one of the (n−1) adders 37-1 to 37-(n−1).

Each of the adders 37-1 to 37-(n−1) is adapted to add together the two multiplication results input from the multipliers 36-1 to 36-n. Each of the adders 37-1 to 37-(n−1) outputs an addition result to the subsequent adder in the adders 37-2 to 37-(n−1). The adder 37-(n−1) outputs an addition result to a squaring circuit 38. That is, the addition result input to the squaring circuit 38 is a cumulative value of the addition results from the adders 37-1 to 37-(n−1).

The squaring circuit 34 squares the addition result input from the adder 33-(n−1) and outputs a squaring result to an adder 39. The squaring circuit 38 squares the addition result input from the adder 37-(n−1) and outputs a squaring result to the adder 39. The adder 39 adds together the signal from the squaring circuit 34 and the signal from the squaring circuit 38, and outputs an addition result to a comparator 40. The comparator 40 is adapted to compare the signal input from the adder 39 with a threshold value A separately input, and to output a comparison result to the TMCC decoder 12.

The operation of the above-described unique word detection circuit 20 will now be described. The processing in the unique word detection circuit 20 will first be expressed by mathematical expressions, and the operation will be described with reference to the mathematical expressions. If an input signal r(t) input to the unique word detection circuit 20 is defined as a complex function, it is shown by an equation (1). Also, a unique word w(t) is represented as a complex function shown by an equation (2). A correlation function R(τ) representing a correlation between the input signal and the unique word is obtained as shown by equation (3).

$$r(t)=i(t)+jq(t) \tag{1}$$

$$w(t)=u(t)+jv(t) \tag{2}$$

$$R(\tau)=\int_{-\infty}^{+\infty} r(t+\tau)\omega^*(t)dt \tag{3}$$

In equations (1) and (2), i(t) and u(t) are real parts while q(t) and v(t) are imaginary parts.

In fact, the signal treated in the unique word detection circuit 20 is a signal sequence processed so as to be discrete and the unique word is a signal sequence of a finite number. Accordingly, if the sequence length of the unique word is N, the correlation function shown by equation (3) is then rewritten into the following equation (4):

$$R(kT) = \sum_{n=0}^{N-1} r\{(n+k)T\}w*(nT) \tag{4}$$

Since in this embodiment the unique word is a BPSK-modulated signal, w(nT) in equation (4) is a real number and w*(nT) is also a real number. If the real part of w*(nT) is Un, and if the real part and the imaginary part of r{(n+k)T} corresponding to the complex signal sequence are $i_{n+k}$ and $q_{n+k}$, respectively, equation (4) is rewritten into the following equation (5):

$$R(kT) = \sum_{n=0}^{N-1} (i_{n+k} + j q_{n+k}) \cdot Un \tag{5}$$

$$= \sum_{n=0}^{N-1} i_{n+k} \cdot Un + j \sum_{n=0}^{N-1} q_{n+k} \cdot Un$$

Equation (5) will be explained in relation to the operation of the unique word detection circuit 20. In the orthogonal demodulation circuit 4, the i-signal processed with the in-phase signal carrier corresponds to the first term of equation (5), i.e., the variable in the real part. When the i-signal is input to the unique word detection circuit 20, it is extracted after being delayed a one-symbol step by each of the n registers 31-1 to 31-n and is multiplied by one of the predetermined tap coefficients $U_1$ to Un by the corresponding one of the multipliers 33-1 to 33-n, and the multiplication results from these multipliers are added together by the adders 33-1 to 33-(n−1), thus calculating the first term of equation (5).

In the orthogonal demodulation circuit 4, the q-signal processed with the quadrature signal carrier corresponds to the second term of equation (5), i.e., the variable in the imaginary part. When the q-signal is input to the unique word detection circuit 20, it is extracted after being delayed a one-symbol step by each of the n registers 35-1 to 35-n and is multiplied by one of the predetermined tap coefficients $U_1$ to Un by the corresponding one of the multipliers 36-1 to 36-n, and the multiplication results from these multipliers are added together by the adders 37-1 to 37-(n−1), thus calculating the second term of equation (5).

As can be understood from the above, the registers, the multipliers and the adders are connected in the unique word detection circuit 20 such as to correspond to equation (5).

When the input signal is the unique word, equation (4) or (5) shows a predetermined coefficient "a", as shown by equations (6).

$$|R(0)|=a(a\neq 0)$$
$$|R(\tau)|=0(\tau\neq 0) \quad (6)$$

When the input signal is the unique word, the absolute value of equation (4) or (5) is a constant "a". Then, referring to FIG. 2, it can be understood that the signal A separately input to the comparator 40 corresponds to the constant "a". In the unique word detection circuit 20, the squaring circuit 34 squares the output of the adder 33-(n−1) (the first term of equation (5)), the squaring circuit 38 squares the output of the adder 37-(n−1) (the second term of equation (5)), and the adder 39 adds the squared outputs together. The comparator 40 compares the addition result with the signal (threshold value) A separately input. If the comparator 40 determines that the addition result from the adder 39 is a value larger than the signal (threshold value) A, it outputs "1". The unique word is thus detected.

As described above, the unique word can be detected from the supplied input signal without performing differential demodulation of the input signal. In this embodiment, the tap coefficient Un is, in fact, +1 or −1 because the input signal is a BPSK-modulated signal. That is, each of the multipliers 32-1 to 32-n, and 36-1 to 36-n, and the adders 33-1 to 33-(n−1), and 37-1 to 37-(n−1) can be formed by a sign inversion control circuit. Therefore, the scale of the unique word detection circuit 20 can be reduced.

Figure 3:
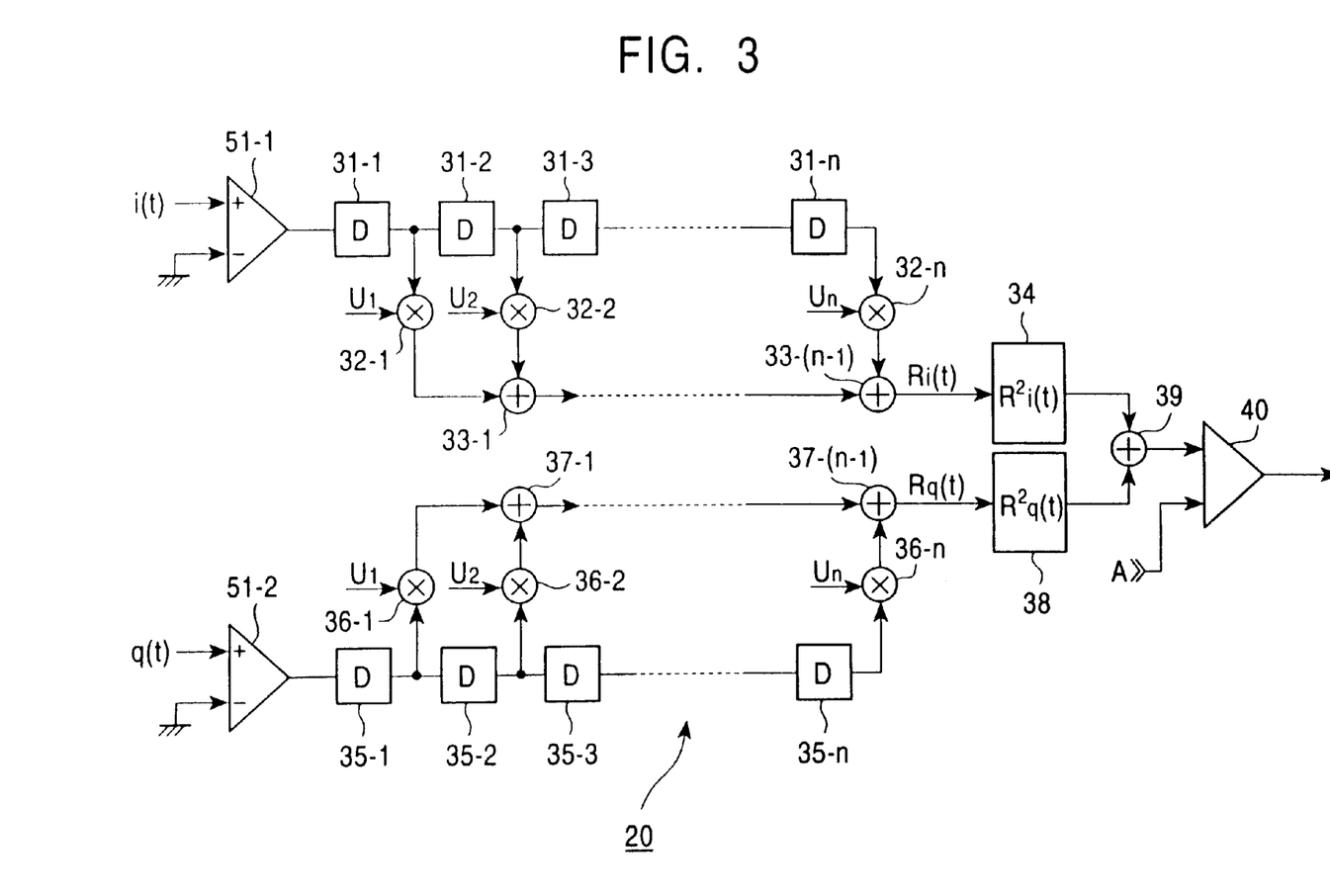
FIG. 3 is a block diagram showing the configuration of another example of the unique word detection circuit 20 which represents a second embodiment of the present invention.

FIG. 3 shows the configuration of another example of the unique word detection circuit 20 which represents a second embodiment of the present invention. This unique word detection circuit is formed in such a manner that a binalization circuit 51-1 is provided as a stage before the register 31-1 of the unique word detection circuit 20 shown in FIG. 2, and a binalization circuit 51-2 is provided as a stage before the register 35-1. In other respects, the arrangement is the same as that shown in FIG. 2.

The binalization circuits 51-1 to 51-2 are adapted to respectively convert input i-signal (real part) and q-signal (imaginary part) into binary signals having a data width of one bit, and to output the binary signals to the registers 31-1 and 35-1. Because the data to be treated becomes binary data, the apparatus can be reduced in size in comparison with an apparatus which quantizes an input signal in the form of a predetermined analog signal or the number of bits of a complex number.

Figure 4:
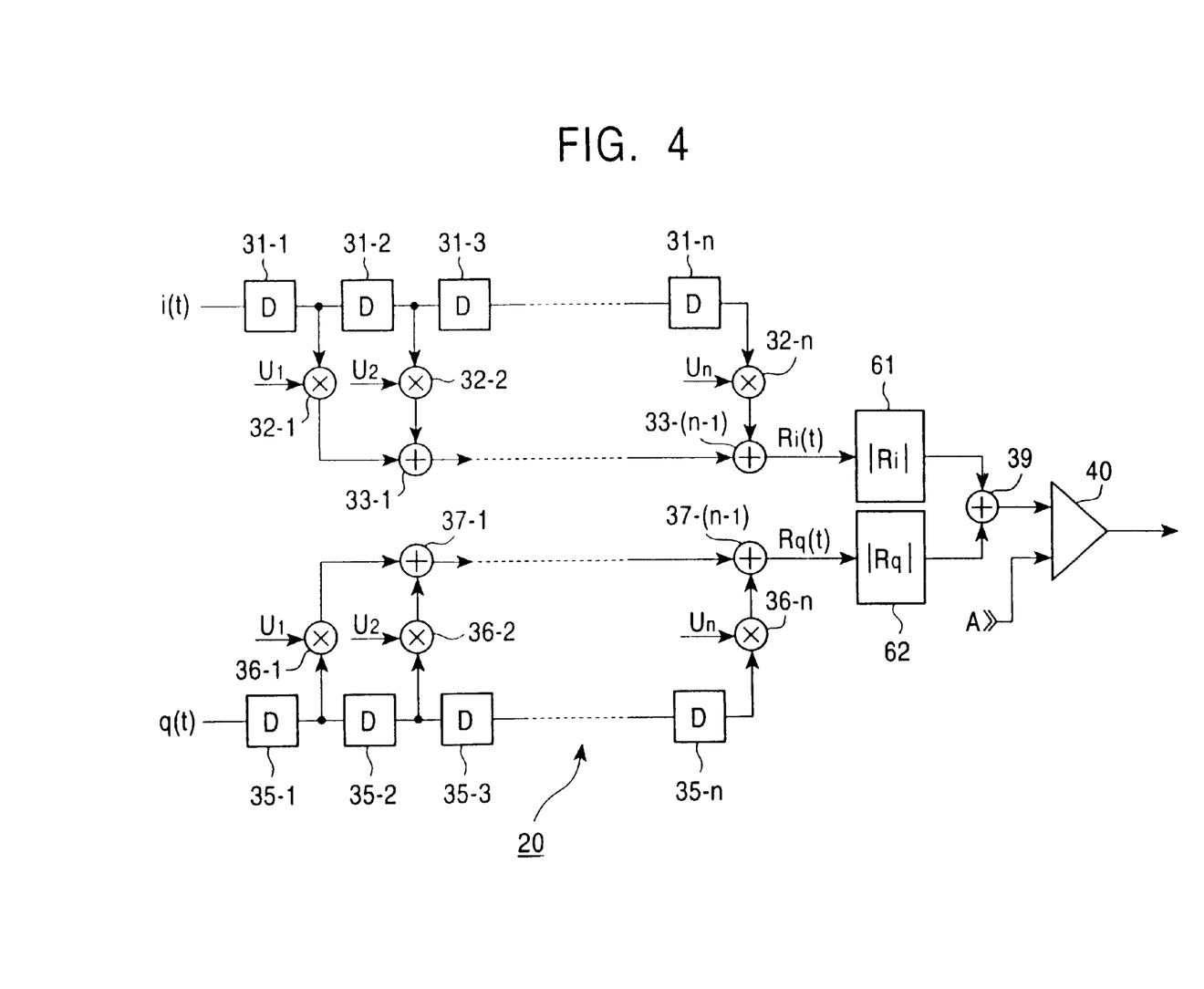
FIG. 4 is a block diagram showing the configuration of still another example of the unique word detection circuit 20 which represents a third embodiment of the present invention.

FIG. 4 shows the configuration of still another example of the unique word detection.circuit 20 which represents a third embodiment of the present invention. This unique word detection circuit is formed in such a manner that absolute value circuits 61 and 62 are provided in place of the squaring circuits 34 and 38 of the unique word detection circuit 20 shown in FIG. 2, thereby enabling the apparatus to be reduced in size.

Figure 5:
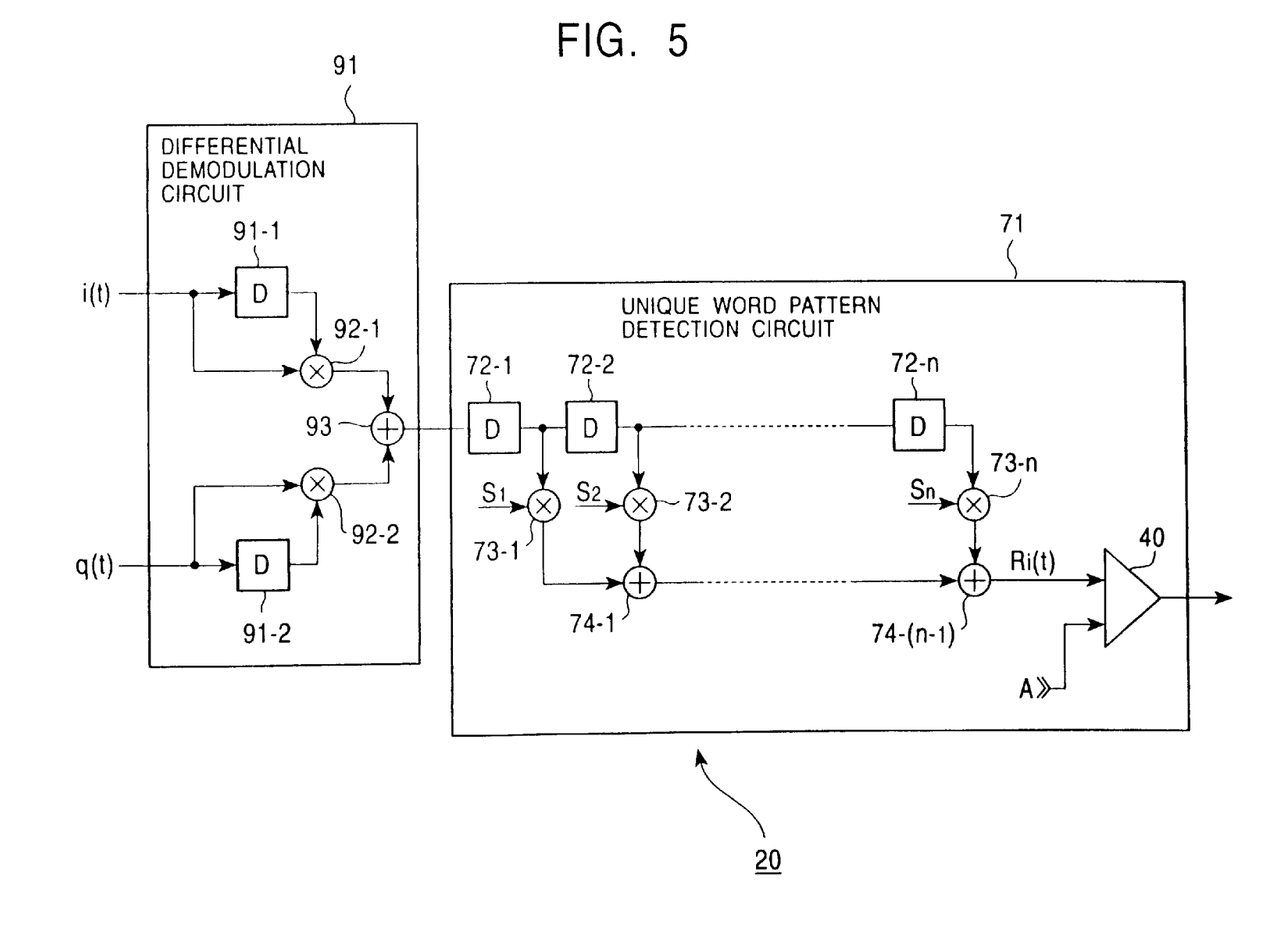
FIG. 5 is a block diagram showing the configuration of still another example of the unique word detection circuit 20 which represents a fourth embodiment of the present invention.

FIG. 5 shows the configuration of still another example of the unique word detection circuit 20 which represents a fourth embodiment of the present invention. In this example, a differential demodulation circuit 91 is provided as a stage before a unique word pattern detection circuit 71. The differential demodulation circuit 91 has registers 91-1 and 91-2, multipliers 92-1 and 92-2, and an adder 93. This differential demodulation circuit is equivalent in configuration and in operation to the differential demodulation circuit shown in FIG. 8.

In the unique word pattern detection circuit 71, a register 72-1 delays an input signal by a predetermined time period (corresponding to one symbol) and outputs the delayed signal to a multiplier 73-1 and to a register 72-2. The multiplier 73-1 multiplies the signal input from the register 72-1 by a predetermined tap coefficient S1 and outputs a multiplication result to an adder 74-1.

The register 72-2 stores the input from the register 72-1 and outputs the stored data to a multiplier 73-2 and to a register 72-3 (not shown) in synchronization with a clock.

Thus, the n registers 72-1 to 72-n successively shift the input signal from each stage to the subsequent one in synchronization with the clock, and supply the stored signal to the n multipliers 73-i to 73-n by respective timings.

Each of the multipliers 73-1 to 73-n multiplies the signal supplied from the corresponding one of the registers 72-1 to 72-n by one of the tap coefficients 51 to Sn, and outputs a multiplication result to one of the (n−1) adders 74-1 to 74-(n−1).

Each of the adders 74-1 to 74-(n−1) adds together the two multiplication results input from the multipliers 73-1 to 73-n. Each of the adders 74-1 to 74-(n−2) outputs an addition result to the subsequent adder in the adders 74-1 to 74-(n−1). A comparator 40 compares the signal input from the adder 74-(n−1) with a threshold value A separately input, and outputs a comparison result to the TMCC decoder 12.

The addition result output from the adder 74-(n−1) is a value representing a correlation between the input signal and a unique word. It is possible to set a tolerance (the difference between the threshold value A and the ideal value) in detecting a unique word if the correlation between the input signal and the unique word is expressed by an analog value to be compared with the threshold value A, as described above. For example, when the input signal is a unique word, the unique word can be detected with an error within the tolerance even if noise is added to the unique word such that the corresponding bit stream is slightly different from the original unique word.

Figure 6:
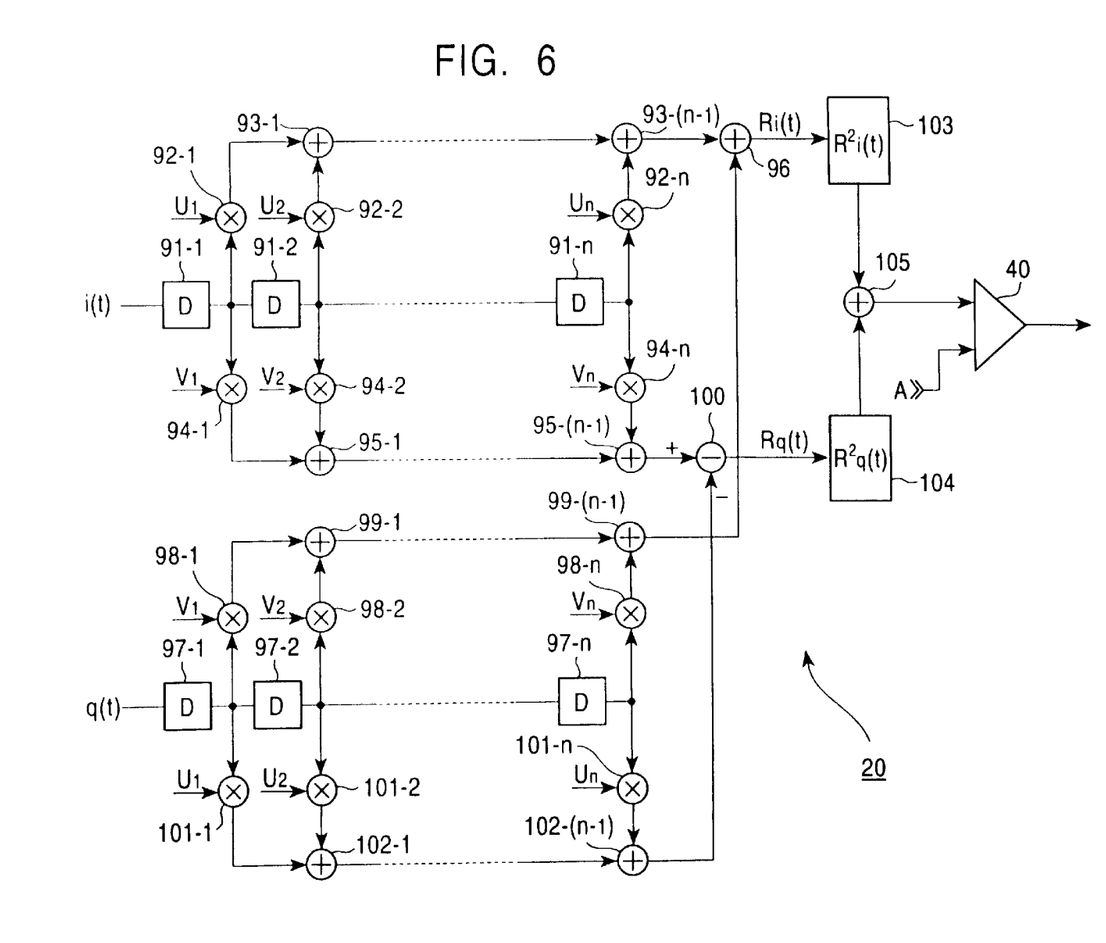
FIG. 6 is a block diagram showing the configuration of a further example of the unique word detection circuit 20 which represents a fifth embodiment of the present invention.

FIG. 6 shows the configuration of a further example of the unique word detection circuit 20 which represents a fifth embodiment of the present invention. N registers 91-1 to 91-n to which the i-signal is input successively shift the input signal from each stage to the subsequent stage in synchronization with a clock, and output the stored signal to n multipliers 92-1 to 92-n and to n multipliers 94-1 to 94-n by respective timings.

Each of the multipliers 92-1 to 92-n multiplies the signal supplied from the corresponding one of the registers 91-1 to 91-n by one of tap coefficients Ul to Un assigned to the multipliers, and outputs a multiplication result to one of (n−1) adders 93-1 to 93-(n−1).

Each of adders 93-1 to 93-(n−1) adds together the two multiplication results input from the multipliers 92-1 to 92-n. Each of adders 93-1 to 93-(n−1) outputs an addition result to the subsequent adder in the adders 93-2 to 93-(n−1). The adder 93-(n−1) outputs an addition result to an adder 96.

Each of the multipliers 94-1 to 94-n multiplies the signal supplied from the corresponding one of the registers 91-1 to 91-n by one of tap coefficients $V_1$ to Vn assigned to the multipliers, and outputs a multiplication result to one of (n−1) adders 95-1 to 95-(n−1).

Each of adders 95-1 to 95-(n−1) adds together the two multiplication results input from the multipliers 94-1 to 94-n. Each of adders 95-1 to 95-(n−1) outputs an addition result to the subsequent adder in the adders 95-2 to 95-(n−1). The adder 95-(n−1) outputs an addition result to a subtracter 100.

The arrangement of n registers 97-1 to 97-n to which the q-signal is input, n multipliers 98-1 to 98-n and n multipliers 101-1 to 101-n connected to these registers, (n−1) adders 99-1 to 99-(n−1), and (n−1) adders 102-1 to 102-(n−1) is basically the same as that of the above-described registers 91-1 to 91-n, multipliers 92-1 to 92-n, and 94-1 to 94-n, and adders 93-1 to 93-(n−1), and 95-1 to 95-(n−1). The description for the corresponding components will not be repeated.

The subtracter 100 subtracts the output of the adder 102-(n−1) from the output of the adder 95-(n−1) and outputs a subtraction result to a squaring circuit 104. The adder 96 adds together the input from the adder 93-(n−1) and the input from the adder 99-(n−1) and outputs an addition result to a squaring circuit 103. The squaring circuit 103 squares the input from the adder 96 and outputs the squared value to an adder 105. The squaring circuit 104 squares the input from the subtracter 100 and outputs the squared value to the adder 105. The adder 105 adds together the input from the squaring circuit 103 and the input from the squaring circuit 104 and outputs an addition result to a comparator 40.

The comparator 40 compares the input from the adder 105 with a predetermined threshold value A, and outputs a predetermined signal when the input from the adder 105 is larger than the threshold value A, as does the above-described corresponding comparator. A unique word is detected based on the complex correlation function shown by equation (3). In this embodiment, even if the input signal is not a BPSK signal but, for example, a QPSK or QAM signal, a unique word can be detected with accuracy.

Absolute circuits may be used in place of the squaring circuits 103 and 104.

A combination of some of the above-described embodiments may also be used.

As a provision medium for providing a computer program for performing the above-described processing to users, recording mediums, such as a magnetic disk, a CD-ROM and a solid-state memory, and communication mediums, such as a network and a satellite, can be used.

The present invention is not limited to the above-described embodiments, and various modifications and applications of the present invention may made without departing from the scope of the invention.

According to the signal processing apparatus and method and the provision medium of the present invention, a value representing a correlation between an input signal and a reference signal is calculated and the calculated correlation value is compared with a predetermined threshold value. In this manner, a unique word, for example, can be detected in a short time with high accuracy without being influenced by noise.

What is claimed is:

1. A signal processing apparatus which detects a reference signal from an input signal formed of a first signal and a second signal orthogonal to each other, said apparatus comprising:

a first correlation value calculation means for calculating a first output value representing a correlation between said first signal and said reference signal;

a second correlation value calculation means for calculating a second output value representing a correlation between said second signal and said reference signal;

a first squaring means for calculating the second power of said first output value;

a second squaring means for calculating the second power of said second output value;

addition means for calculating a sum of said second powers; and comparison means for comparing said sum with a predetermined threshold value.

2. A signal processing apparatus which detects a reference signal from an input signal formed of a first signal and a second signal orthogonal to each other, said apparatus comprising:

a first correlation value calculation means for calculating a first output value representing a correlation between said first signal and said reference signal;

a second correlation value calculation means for calculating a second output value representing a correlation between said second signal and said reference signal;

a first absolute value means for calculating the absolute value of said first output value;

a second absolute value means for calculating the absolute value of said second output value;

addition means for calculating a sum of said absolute values; and comparison means for comparing said sum with a predetermined threshold value.

3. A method for detecting a reference signal from an input signal formed from a first signal and a second signal orthogonal to each other, comprising:

calculating a first correlation value representing a correlation between said first signal and said reference signal;

calculating a second correlation value representing a correlation between said second signal and said reference signal;

calculating the second power of said first correlation value;

calculating the second power of said second correlation value;

calculating a sum of said second powers; and comparing said sum with a predetermined threshold value.

4. A method for detecting a reference signal from an input signal formed from a first signal and a second signal orthogonal to each other, comprising:

calculating a first correlation value representing a correlation between said first signal and said reference signal;

calculating a second correlation value representing a correlation between said second signal and said reference signal;

calculating the absolute value of said first correlation value;

calculating the absolute value of said second correlation value;

calculating a sum of said absolute values; and comparing said sum with a predetermined threshold value.

* * * * *